Dec. 4, 1934.　　　　B. F. JENKINS　　　　1,982,669
DEVICE FOR TESTING IMPACT TOOLS
Filed March 12, 1932　　3 Sheets-Sheet 1

INVENTOR
BERNARD F. JENKINS
BY
ATTORNEY

Dec. 4, 1934.                B. F. JENKINS                1,982,669
               DEVICE FOR TESTING IMPACT TOOLS
                   Filed March 12, 1932     3 Sheets-Sheet 2

INVENTOR
BERNARD F. JENKINS
BY
        ATTORNEY

Dec. 4, 1934.  B. F. JENKINS  1,982,669
DEVICE FOR TESTING IMPACT TOOLS
Filed March 12, 1932  3 Sheets-Sheet 3

INVENTOR
BERNARD F. JENKINS
BY
ATTORNEY

Patented Dec. 4, 1934

1,982,669

UNITED STATES PATENT OFFICE 1,982,669

DEVICE FOR TESTING IMPACT TOOLS

Bernard F. Jenkins, United States Navy

Application March 12, 1932, Serial No. 598,359

9 Claims. (Cl. 73—51)

(Granted under the act of March 3, 1883, as amended April 30, 1928; 370 O. G. 757)

This invention relates to a device for testing impact tools such as pneumatic or electric hammers, and has for its object to provide a simple, accurate and inexpensive means to measure, in terms of a standard, the driving or striking efficiency of tools of the type mentioned.

In the drawings:

Fig. 3 is an end view of the sliding carriage;

Figure 1:
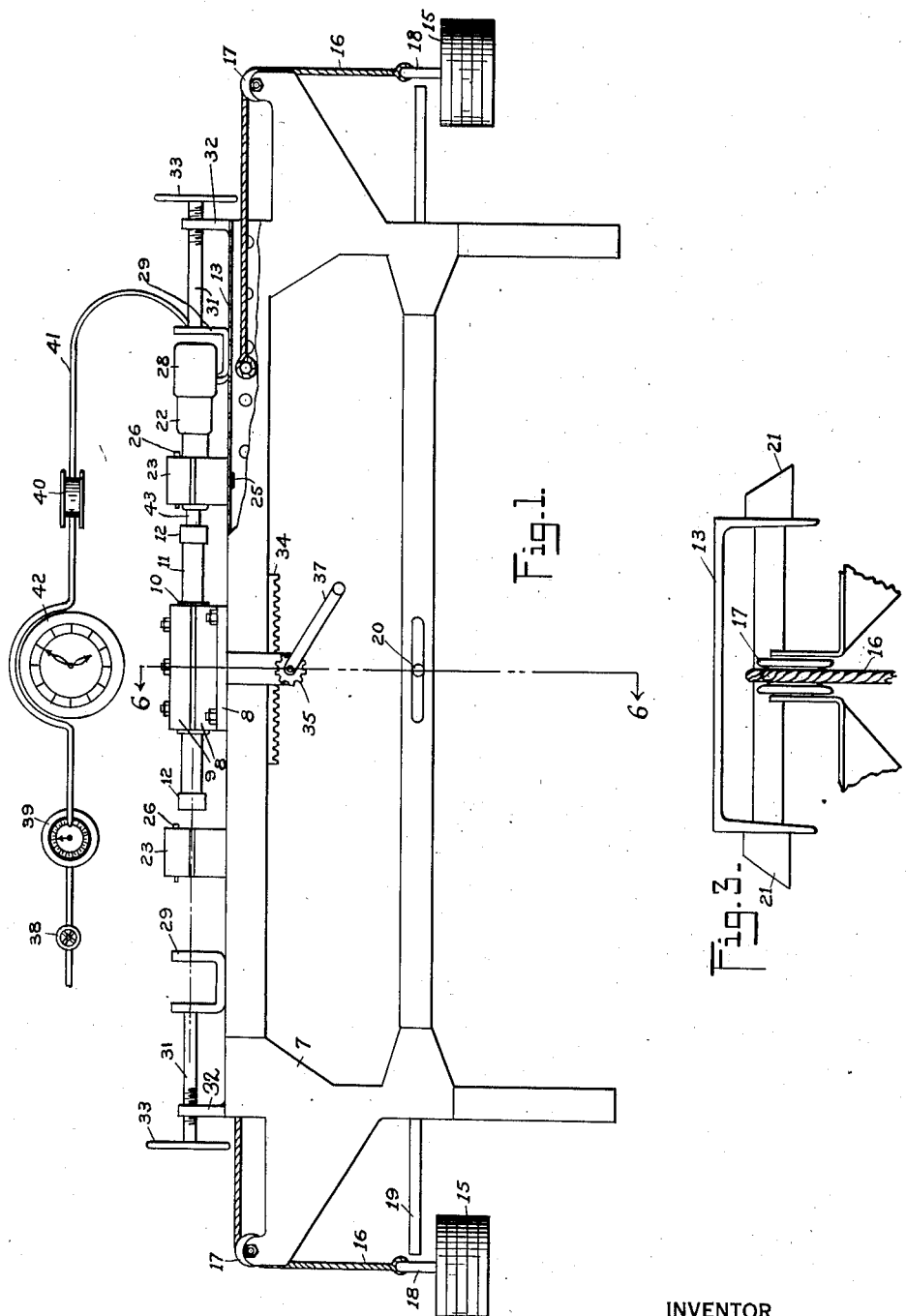
Fig. 1 is a side elevational view of my invention.
Figure 2:
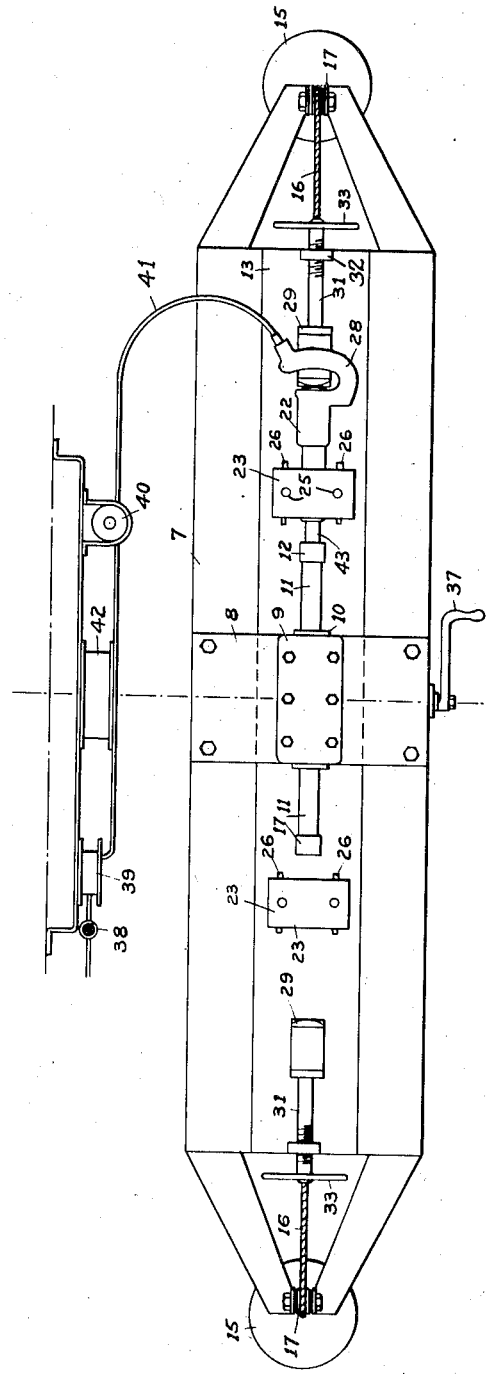
Fig. 2 is a top plan view thereof.
Figure 4:
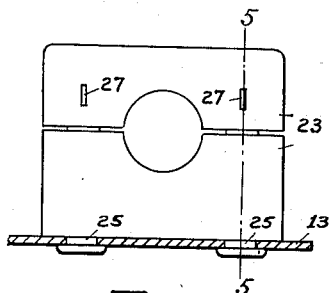
Fig. 4 is a side elevation of the hammer clamp.
Figure 5:
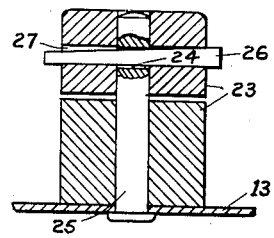
Fig. 5 is a section taken on line 5—5 of Fig. 4.
Figure 6:
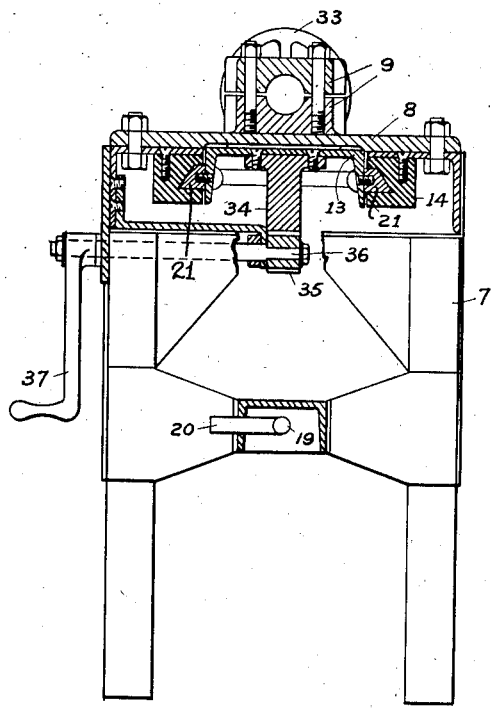
Fig. 6 is a cross-sectional elevation on the line 6—6 of Fig. 1.

Devices for the determination of the absolute driving effort of pneumatic and like hammers are known, but because of their complexity and the fact that they record the results in the form of a graph, they find little or no application in the average plant. My invention provides a device and a quick and practical method whereby the average workman can test such hammers. The efficiency is determined by making direct comparison of its driving effort with that of a standard hammer of the same size and type, and controlling the conditions so they will be equal in both cases.

Bridge 8 is secured to the upper surface of bench 7, and carries the two-piece bar clamp 9 in which is a two-piece bronze bushing 10 that applies a frictional load to the driving bar 11, which load is variable by changing the pressure of the parts of clamp 9 thereon. Driving bar 11 is of steel and has its ends protected against damage by tool steel caps 12.

The hammer holding devices are provided at each end of the table to make it possible to drive the bar in both directions, thus obviating the necessity of releasing the bar 11 to move it back to the starting position and readjusting it. A carriage 13 is slidable longitudinally of the bench under bridge 8 in guides 14; counter-weights 15 suspended on cables 16 are connected to carriage 13 and pass over pulleys 17 to move the carriage, the weight at that end of the carriage opposite the direction of movement being held inactive by passing the longitudinally slidable bar 19 through the eye 18 of the rod that carries the weight. A laterally extending handle 20 attached to bar 19 serves to move the bar. Beveled rails 21 on carriage 13 move in similarly shaped grooves in guides 14 and keep the carriage accurately aligned with the longitudinal axis of bar 11.

The body of hammer 22 is rigidly held in clamps 23. Transverse slots 24 in pins 25 that extend through carriage 13 and both parts of clamps 23 are aligned with slots 27 in the upper clamp members and are adapted to receive tapered pins 26 which, when driven into the slots 24 and 27, bind the parts of the clamps tightly against the hammer. Shaft 31 has threaded engagement with bracket 32 and is rotatable by means of hand wheel 33 on one end thereof. The other end of shaft 31 is of smaller diameter and a shoulder is formed at the junction of the portion of less diameter with the shaft; the smaller portion is rotatable in a hole in one leg of U-shaped member 29 and the shoulder mentioned bears against member 29 and forces the other leg of that member against the end of the barrel of the tool to hold the tool against recoil.

Rapid movement of carriage 13 toward or away from bar 11 to facilitate the removal or mounting of a hammer is accomplished by rack 34 secured to carriage 13 and meshed with pinion 35 on shaft 36 that is rotatable by means of crank 37. Uniformity of conditions of operation is secured by passing the air to drive the hammer through pressure control valve 38, pressure gauge 39 and flow meter 40, hose 41 being connected to conduct the air to the hammer from meter 40. If pressure or volume vary during the course of a test, the effect of that variation can be considered in the computation. When an electric hammer is to be tested, a volt meter and ammeter, or a wattmeter, will be substituted for the pressure gauge 39 and flow meter 40. Preferably a clock 42 is mounted for convenient observation to time the tests.

The method of operation is as follows:

A short blunt chisel 43 is chucked in a standard hammer (preferably a new one) of the size and type to be tested, and the hammer is mounted with the chisel in contact with one of the caps 12. The hammer is then operated for a chosen time interval, such as fifteen seconds, during which period the distance bar 11 is driven against the frictional load imposed on the bar by clamp 9 is measured in any suitable way. The pressure and flow of the air as shown by pressure gauge 39 and flow meter 40 are also recorded. The hammer to be tested is then substituted for the standard for an equal time interval and the same data recorded. The efficiency of the tested hammer is equal to the quotient of the distance the bar 11 is driven by the tested hammer divided by the distance it is driven by the standard hammer. The active counter-weight moves carriage 13 to hold chisel 43 in effective contact with cap 12, the inertia of the weight and the carriage preventing recoil of the hammer from moving chisel 43 out of contact with cap 12. An accurate comparison of the working capacity of any hammer may thus be obtained in terms of the efficiency of a hammer of known performance. The adjustment of the device should be checked occasionally by the standard to prevent erroneous results due to possible variations in the frictional load.

It will be understood that the above description and accompanying drawings comprehend only the general and preferred embodiment of my invention, and that various changes in the construction, proportion and arrangement of parts may be made within the scope of the appended claims without sacrificing any of the advantages of my invention.

The invention described herein may be manufactured and used by or for the Government of the United States for governmental purposes without the payment to me of any royalties thereon.

I claim:

1. A device for testing impact tools, comprising a bench, a carriage slidable thereon, a flexible member connected to each end thereof, a weight carried by each of said members, a longitudinally slidable bar adapted selectively to hold one of said weights inactive, a bridge mounted on said bench over said carriage, clamping means on said bridge, a bushing of relatively soft metal in said means, a bar frictionally held in said bushing, a cap on each end of said bar, a rack and pinion operative to move said carriage; clamping means on said carriage on each side of said bridge to hold a tool comprising an upper member having transverse slots therein and a lower member, pins extending through said carriage and through both clamp members, said pins having slots in registry with the slots in said clamp members, and tapered pins adapted to be driven into the slots in said clamp members and said pins; clamping means for the handle of the tool comprising a U-shaped element and a screw to force one limb of said element against the end of the tool barrel, and means for controlling and measuring the power input into a tool being tested.

2. A device for testing impact tools, comprising a bench, a carriage slidable thereon, a flexible member connected to each end thereof, a weight carried by each of said members, a longitudinally slidable bar adapted selectively to hold one of said weights inactive, a bridge mounted on said bench over said carriage, clamping means on said bridge, a bushing of relatively soft metal in said means, a bar frictionally held in said bushing, a cap on each end of said bar, means to move said carriage, clamping means on said carriage on each side of said bridge to hold a tool, adjacent cooperating means to prevent recoil of the tool, and means for controlling and measuring the power input into a tool being tested.

3. A device for testing impact tools, comprising a bench, a carriage slidable thereon, a flexible member connected to each end thereof, a weight carried by each of said members, a longitudinally slidable bar adapted selectively to hold one of said weights inactive, a bridge mounted on said bench over said carriage, clamping means on said bridge, a bushing of relatively soft metal in said means, a bar frictionally held in said bushing, a cap on each end of said bar, a rack and pinion operative to move said carriage; clamping means on said carriage on each side of said bridge to hold a tool comprising an upper member having transverse slots therein and a lower member, pins extending through said carriage and through both clamp members, said pins having slots in registry with the slots in said clamp members, and tapered pins adapted to be driven into the slots in said clamp members and said pins, and clamping means for the handle of the tool comprising a U-shaped element and a coacting screw to force a limb of said element against the barrel of the tool.

4. A device for testing impact tools, comprising a bench, a carriage slidable thereon, a flexible member connected to each end thereof, a weight carried by each of said members, a longitudinally slidable bar adapted selectively to hold one of said weights inactive, a bridge mounted on said bench over said carriage, clamping means on said bridge, a bushing of relatively soft metal in said means, a bar frictionally held in said bushing, a cap on each end of said bar, means to move said carriage, clamping means on said carriage on each side of said bridge to hold a tool, and adjacent cooperating means to prevent recoil of the tool.

5. A device for testing impact tools, comprising a bench, a carriage reciprocably slidable thereon, gravity means for moving said carriage in either direction, means selectively to hold said gravity means inactive as to one direction, clamping means mounted on said bench, a frictional element in said clamping means, a longitudinally drivable bar held by said frictional element, clamping means on said carriage to hold a tool in operative relation with said bar, manually operable means to shift said carriage, and means to measure the power input into a tool being tested.

6. A device for testing impact tools, comprising a bench, a carriage slidable thereon, means for moving said carriage, clamping means on said bench, a longitudinally drivable bar frictionally held by said clamping means, clamping means on said carriage to hold a tool in operative relation with said bar, and means to measure the power input into a tool being tested.

7. A device for testing impact tools, comprising a bench, a carriage reciprocably slidable thereon, gravity means for moving said carriage in either direction, means selectively to hold said gravity means inactive as to one direction, clamping means mounted on said bench, a frictional element in said clamping means, a longitudinally drivable bar held by said frictional element, clamping means on said carriage to hold a tool in operative relation with said bar, and manually operable means to shift said carriage.

8. A device for testing impact tools, comprising a bench, a carriage slidable thereon, means for moving said carriage, clamping means on said bench, a longitudinally drivable bar frictionally held by said clamping means, and clamping means on said carriage to hold a tool in operative relation with said bar.

9. A device for testing impact tools, comprising a longitudinally drivable element, means to apply a purely frictional load to said element, means to hold a tool in operative relation with said element, and means to measure the power input into such tool.

BERNARD F. JENKINS.